US010887474B2

(12) United States Patent
Toscano et al.

(10) Patent No.: US 10,887,474 B2
(45) Date of Patent: Jan. 5, 2021

(54) SYSTEMS AND METHODS FOR GENERATING AND COMMUNICATING ENHANCED PORTABLE DOCUMENT FORMAT FILES

(71) Applicant: Open Text Holdings, Inc., San Mateo, CA (US)

(72) Inventors: Francis Toscano, Kendall Park, NJ (US); Felix Moletteri, Oceansport, NJ (US)

(73) Assignee: OPEN TEXT HOLDINGS, INC., Halifax (CA)

( * ) Notice: Subject to any disclaimer, the term of this patent is extended or adjusted under 35 U.S.C. 154(b) by 0 days.

(21) Appl. No.: 16/564,413

(22) Filed: Sep. 9, 2019

(65) Prior Publication Data

US 2020/0007699 A1    Jan. 2, 2020

Related U.S. Application Data

(63) Continuation of application No. 15/979,863, filed on May 15, 2018, now Pat. No. 10,440,199, which is a
(Continued)

(51) Int. Cl.
*H04N 1/00*    (2006.01)

(52) U.S. Cl.
CPC ....... *H04N 1/00214* (2013.01); *H04N 1/0022* (2013.01); *H04N 1/00212* (2013.01)

(58) Field of Classification Search
None
See application file for complete search history.

(56) References Cited

U.S. PATENT DOCUMENTS

| 4,187,520 A | 2/1980 | Beduchaud |
| 4,371,752 A | 2/1983 | Matthews et al. |

(Continued)

FOREIGN PATENT DOCUMENTS

| EP | 0944233 | 9/1999 |
| EP | 1081934 | 3/2001 |

(Continued)

OTHER PUBLICATIONS

PDF Reference fifth edition, Version 1.6, Adobe Portable Document Format, 2004.*

(Continued)

*Primary Examiner* — Paul F Payer
(74) *Attorney, Agent, or Firm* — Sprinkle IP Law Group

(57) ABSTRACT

A method for converting a facsimile includes receiving the facsimile via the public-switched telephone network, generating an enhanced portable document format (EPDF) file that includes information in addition to image information and communicating the EPDF file to an e-mail server. The EPDF file can then be communicated as an attachment to an e-mail message addressed to the intended recipient of the facsimile. A facsimile processing system includes a public-switched telephone network interface, a packet-switched network interface, a mail transfer protocol server, an input agent, a job processor and a translator. The input agent identifies and forwards the incoming facsimile to the job processor. The job processor determines when an EPDF file is desired and communicates appropriate instructions to the translator. The translator generates the EPDF file in response to the instructions and the image information from the facsimile. The translator integrates signatures and repositionable notes in outbound facsimiles.

17 Claims, 9 Drawing Sheets

Related U.S. Application Data continuation of application No. 12/022,362, filed on Jan. 30, 2008, now Pat. No. 10,003,701.

(56) References Cited

U.S. PATENT DOCUMENTS

| | | | |
|---|---|---|---|
| 4,764,951 A | 8/1988 | Kotani et al. |
| 4,922,524 A | 5/1990 | Baba et al. |
| 5,222,211 A | 1/1993 | Mueller |
| 5,220,417 A | 6/1993 | Sugiura |
| 5,237,430 A | 8/1993 | Sakurai |
| 5,289,532 A | 2/1994 | Ishikawa et al. |
| 5,291,302 A | 3/1994 | Gordon |
| 5,305,376 A | 4/1994 | Ukegawa |
| 5,367,619 A | 11/1994 | Dipaolo |
| 5,375,176 A | 12/1994 | Spitz |
| 5,377,257 A | 12/1994 | Shirasaka et al. |
| 5,386,298 A | 1/1995 | Bronnenberg et al. |
| 5,412,710 A | 5/1995 | Tanaka |
| 5,423,043 A | 6/1995 | Fitzpatrick et al. |
| 5,434,775 A | 7/1995 | Sims et al. |
| 5,452,099 A | 9/1995 | Von Meister |
| 5,483,580 A | 1/1996 | Brandman et al. |
| 5,517,556 A | 5/1996 | Pounds et al. |
| 5,559,860 A | 9/1996 | Mizikovsky |
| 5,563,998 A | 10/1996 | Yaksich |
| 5,627,764 A | 5/1997 | Schutzman et al. |
| 5,631,948 A | 5/1997 | Bartholomew et al. |
| 5,664,185 A | 9/1997 | Landfield et al. |
| 5,675,507 A | 10/1997 | Bobo, II |
| 5,715,302 A | 2/1998 | Lee |
| 5,717,498 A | 2/1998 | Itoh |
| 5,717,744 A | 2/1998 | Tyoshida et al. |
| 5,742,905 A | 4/1998 | Pepe et al. |
| 5,761,283 A | 6/1998 | Chung |
| 5,767,985 A | 6/1998 | Yamamoto et al. |
| 5,781,886 A | 7/1998 | Tsujiuchi |
| 5,822,404 A | 10/1998 | Cave |
| 5,825,990 A | 10/1998 | Heo et al. |
| 5,978,454 A | 11/1999 | King et al. |
| 5,991,469 A | 11/1999 | Johnson |
| 6,020,980 A | 2/2000 | Freeman |
| 6,043,904 A | 3/2000 | Nickerson |
| 6,321,267 B1 | 11/2001 | Donaldson |
| 6,356,356 B1 | 3/2002 | Miller et al. |
| 6,424,426 B1 | 7/2002 | Henry |
| 6,466,909 B1 | 10/2002 | Didcock et al. |
| 6,477,494 B2 | 11/2002 | Hyde-Thompson et al. |
| 6,487,533 B2 | 11/2002 | Hyde-Thompson et al. |
| 6,549,612 B2 | 4/2003 | Gifford et al. |
| 6,636,587 B1 | 10/2003 | Nagai et al. |
| 6,696,848 B2 | 2/2004 | Robinson |
| 6,745,221 B1 | 6/2004 | Ronca |
| 6,785,021 B1 | 8/2004 | Gordon et al. |
| 6,856,676 B1 | 2/2005 | Pirot et al. |
| 6,906,817 B1 | 6/2005 | Berard et al. |
| 6,972,858 B1 | 12/2005 | Nishida et al. |
| 6,981,023 B1 | 12/2005 | Hamilton et al. |
| 6,985,494 B2 | 1/2006 | Thompson |
| 7,095,517 B1 | 8/2006 | Hori |
| 7,142,550 B1 | 11/2006 | Umansky |
| 7,143,290 B1 | 11/2006 | Ginter et al. |
| 7,283,272 B2 * | 10/2007 | Johnson ............ H04N 1/00209 358/1.15 |
| 7,502,841 B2 | 3/2009 | Small et al. |
| 7,509,648 B1 | 3/2009 | Afshar et al. |
| 7,613,280 B1 | 11/2009 | Lunde et al. |
| 7,616,336 B2 | 11/2009 | Nakamura |
| 7,620,177 B2 | 11/2009 | Ibrahim et al. |
| 7,653,185 B2 | 1/2010 | Rebert et al. |
| 7,672,003 B2 | 3/2010 | Dowling |
| 7,804,823 B2 | 9/2010 | Toscano et al. |
| 7,904,811 B2 | 3/2011 | Saito |
| 7,978,353 B2 | 7/2011 | Kasatani |
| 8,116,303 B2 | 2/2012 | Toscano et al. |
| 8,395,795 B2 | 3/2013 | Toscano et al. |
| 8,896,869 B2 | 11/2014 | Toscano et al. |
| 9,191,527 B2 | 11/2015 | Toscano et al. |
| 10,440,199 B2 | 10/2019 | Toscano et al. |
| 2002/0049817 A1 | 4/2002 | Drory et al. |
| 2002/0051164 A1 | 5/2002 | Watanabe et al. |
| 2002/0054367 A1 | 5/2002 | Tsuchiya |
| 2002/0099456 A1 | 7/2002 | Mclean |
| 2002/0133516 A1 | 9/2002 | Davis et al. |
| 2002/0140986 A1 | 10/2002 | Takayama |
| 2002/0165822 A1 | 11/2002 | Makipaa |
| 2002/0176117 A1 | 11/2002 | Randalli et al. |
| 2003/0093322 A1 | 5/2003 | Sciuk |
| 2003/0112472 A1 | 6/2003 | Eguchi et al. |
| 2003/0117665 A1 | 6/2003 | Eguchi et al. |
| 2003/0164986 A1 | 9/2003 | Boire Lavigne et al. |
| 2003/0187939 A1 | 10/2003 | O'Brien |
| 2003/0193967 A1 | 10/2003 | Fenton et al. |
| 2003/0204501 A1 | 10/2003 | Moon |
| 2003/0231207 A1 | 12/2003 | Huang |
| 2003/0233414 A1 | 12/2003 | Henry |
| 2003/0233467 A1 | 12/2003 | Ogasawara |
| 2004/0095612 A1 | 5/2004 | Eguchi et al. |
| 2004/0114194 A1 | 6/2004 | Eguchi et al. |
| 2004/0150157 A1 | 8/2004 | Meade |
| 2004/0186895 A1 | 9/2004 | Ellis |
| 2005/0021631 A1 | 1/2005 | El-Gazzar et al. |
| 2005/0063005 A1 | 3/2005 | Phillips et al. |
| 2005/0134903 A1 | 6/2005 | Tanimoto |
| 2005/0141485 A1 | 6/2005 | Miyajima et al. |
| 2005/0146753 A1 | 7/2005 | Firooz et al. |
| 2005/0157320 A1 | 7/2005 | Sako et al. |
| 2005/0179961 A1 | 8/2005 | Czyszczewski et al. |
| 2005/0188226 A1 | 8/2005 | Kasatani |
| 2005/0219614 A1 | 10/2005 | Garg et al. |
| 2005/0254083 A1 | 11/2005 | Bodart |
| 2006/0026597 A1 | 2/2006 | Sakou |
| 2006/0044598 A1 | 3/2006 | Etelapera |
| 2006/0050299 A1 | 3/2006 | Sakata et al. |
| 2006/0189333 A1 | 8/2006 | Othmer |
| 2006/0277141 A1 | 12/2006 | Palmer |
| 2006/0280165 A1 | 12/2006 | Blumenschein et al. |
| 2006/0291453 A1 | 12/2006 | Kuwahara |
| 2007/0011362 A1 | 1/2007 | Umekage et al. |
| 2007/0106904 A1 | 5/2007 | Christoff et al. |
| 2007/0115512 A1 | 5/2007 | Noel et al. |
| 2007/0198560 A1 | 8/2007 | Foygel et al. |
| 2007/0247661 A1 | 10/2007 | Minami et al. |
| 2007/0255628 A1 | 11/2007 | Takahashi et al. |
| 2008/0089327 A1 | 4/2008 | Lu et al. |
| 2008/0183754 A1 | 7/2008 | Kitada |
| 2008/0263071 A1 | 10/2008 | Ferlitsch et al. |
| 2009/0025078 A1 | 1/2009 | Kuehr-Mclaren |
| 2009/0067414 A1 | 3/2009 | Toscano et al. |
| 2009/0067418 A1 | 3/2009 | Toscano et al. |
| 2009/0128861 A1 | 5/2009 | Toscano et al. |
| 2009/0164881 A1 | 6/2009 | Segarra et al. |
| 2009/0190159 A1 | 7/2009 | Toscano |
| 2009/0210383 A1 | 8/2009 | Seemann |
| 2009/0244638 A1 | 10/2009 | Evevsky |
| 2009/0300380 A1 | 12/2009 | Vojak et al. |
| 2010/0315683 A1 | 12/2010 | Toscano et al. |
| 2013/0148797 A1 | 6/2013 | Toscano et al. |
| 2015/0055180 A1 | 2/2015 | Toscano et al. |

FOREIGN PATENT DOCUMENTS

| | | |
|---|---|---|
| EP | 1083732 | 3/2001 |
| JP | 2000268012 | 9/2000 |
| JP | 2002009976 | 1/2002 |
| JP | 2003319128 | 11/2003 |
| JP | 2005244794 | 9/2005 |
| KR | 20030056621 | 4/2003 |
| KR | 1020060112501 | 11/2006 |

(56) References Cited

FOREIGN PATENT DOCUMENTS

| WO | WO 2001060050 | 8/2001 |
|----|---------------|--------|
| WO | WO 2006089223 | 8/2006 |

OTHER PUBLICATIONS

Office Action for U.S. Appl. No. 12/022,362, dated Apr. 5, 2010, 21 pgs.
Office Action for U.S. Appl. No. 12/022,362, dated Sep. 24, 2010, 33 pgs.
International Search Report for PCT Application No. PCT/US2009/056229, dated Dec. 10, 2010, 3 pgs.
International Search Report for PCT Application No. PCT/US2008/075173, dated Mar. 20, 2009, 2 pgs.
Office Action for U.S. Appl. No. 12/022,362, dated Jun. 17, 2011, 33 pgs.
Office Action for U.S. Appl. No. 12/022,362, dated Nov. 21, 2011, 38 pgs.
Office Action for U.S. Appl. No. 12/022,362, dated Jan. 7, 2013, 58 pgs.
"How to Manage PDF Metadata," retrieved from www.montague.com/abstracts/pdfmetadata.htm, dated Aug. 2006, 8 pgs.
PDF Reference, Fifth Edition, Adobe Portable Document Format Version 1.6, Nov. 2004, 1236 pgs., Adobe Systems Incorporated, San Jose, CA, at <http://www.adobe.com/content/dam/Adobe/en/devnet/acrobat/pdfs/pdf_reference_1-7.pdf>.
Thomas, Kas, Portable Document Format: An Introduction for Programmers, MacTech Magazine, The journal of Apple technology, 1999, 18 pgs., vol. 15, Issue No. 9, Emerging Technologies.
Office Action for U.S. Appl. No. 12/022,362, dated Jun. 11, 2013, 36 pgs.
Office Action for U.S. Appl. No. 12/022,362, dated Sep. 26, 2013, 37 pgs.
Office Action for U.S. Appl. No. 12/022,362, dated Jan. 15, 2014, 37 pgs.
Office Action for U.S. Appl. No. 12/022,362, dated Apr. 15, 2014, 37 pgs.
Bienz et al., Portable Document Format Reference Manual, Version 1.2, Adobe Systems Incorporation, Nov. 27, 1996, 8 pgs.
Office Action for U.S. Appl. No. 12/022,362, dated Oct. 16, 2014, 33 pgs.
Office Action for U.S. Appl. No. 12/022,362, dated Feb. 10, 2015, 35 pgs.
Office Action for U.S. Appl. No. 12/022,362, dated Jun. 19, 2015, 27 pgs.
Office Action for U.S. Appl. No. 12/022,362, dated Nov. 23, 2015, 27 pgs.
Office Action for U.S. Appl. No. 12/022,362, dated Aug. 28, 2017, 322 pgs.
PDF Reference, Fifth Edition, Adobe Portable Document Format, Version 1.6, Nov. 2004, Adobe Systems Incorporated, p. 684.
Written Opinion for PCT Application No. PCT/US2008/075173, dated Mar. 20, 2009, 6 pgs.
International Preliminary Report on Patentability (IPRP) for PCT Application No. PCT/US2008/075173, dated Mar. 20, 2009, 7 pgs.
Office Action for U.S. Appl. No. 11/852,315, dated Sep. 28, 2010, dated Sep. 28, 2010, 22 pgs.
Office Action for U.S. Appl. No. 11/852,315, dated Sep. 28, 2010, dated Jun. 17, 2011, 22 pgs.
Extended EP Search Report for EP Application No. 09813499.2, dated Jul. 18, 2011, 7 pgs.
Utano, Jack, "Use of Facsimile Technology in Document Delivery Systems," Mar. 1992: CENDI Integrated Computer Systems, Inc, Oak Ridge, TN, 59 pgs.
European Search Report for EP Application No. 08799129.5, dated Nov. 17, 2011, 8 pgs.
Office Action for U.S. Appl. No. 11/852,315, dated Jul. 19, 2012, 27 pgs.
Action closing prosecution in Re-Examination Application No. 95/001,680, issued Sep. 9, 2011, 34 pgs.
Office Action for U.S. Appl. No. 12/207,310, dated Feb. 19, 2010, 15 pgs.
Notice of Allowance for U.S. Appl. No. 12/207,310, dated Jul. 28, 2010, 7 pgs.
Office Action for U.S. Appl. No. 12/860,899, dated Jan. 27, 2011, 10 pgs.
Office Action for U.S. Appl. No. 12/860,899, dated Aug. 19, 2011, 14 pgs.
Office Action for U.S. Appl. No. 13/760,890, dated Sep. 18, 2013, 24 pgs.
Office Action for U.S. Appl. No. 13/760,890, dated Feb. 21, 2014, 13 pgs.
Notice of Allowance for U.S. Appl. No. 13/760,890, dated Jul. 24, 2014, 4 pgs.
Office Action for U.S. Appl. No. 14/527,909, dated Jan. 16, 2015, 8 pgs.
Office Action for U.S. Appl. No. 14/527,909, dated Jun. 29, 2015, 5 pgs.
Notice of Allowance for U.S. Appl. No. 14/527,909, dated Aug. 18, 2015, 7 pgs.
Office Action for U.S. Appl. No. 12/358,851, dated Nov. 29, 2010, 11 pgs.
Office Action for U.S. Appl. No. 12/358,851, dated Jun. 17, 2011, 13 pgs.
Office Action for U.S. Appl. No. 12/358,851, dated Nov. 29, 2011, 14 pgs.
Office Action for U.S. Appl. No. 12/358,851, dated Mar. 15, 2012, 19 pgs.
Written Opinion for PCT Application No. PCT/US2009/056229, dated Dec. 10, 2010, 5 pgs.
International Preliminary Report on Patentability for PCT Application PCT/US2009/058229, dated Mar. 9, 2010, 7 pgs.
European Examination Report for European Patent Application No. 08 799 129.5, dated Aug. 9, 2012, 8 pgs.
Office Action for U.S. Appl. 12/358,851, dated Jun. 18, 2013, 15 pgs.
Office Action for U.S. Appl. No. 12/358,851, dated Jan. 13, 2014, 15 pgs.
Patent Board Decision of Examiner's Affirmation for Inter Partes Re Examination Control No. 95/001,680, mailed on Dec. 16, 2016, 7 pgs.
Notice of Intent to Issue Certificate for Inter Partes Re Examination Control No. 95/001,680, mailed Mar. 31, 2017, 10 pgs.
Notice of Allowance for U.S. Appl. No. 15/979,863, dated May 24, 2019, 6 pgs.

* cited by examiner

SYSTEMS AND METHODS FOR GENERATING AND COMMUNICATING ENHANCED PORTABLE DOCUMENT FORMAT FILES

CROSS-REFERENCE TO RELATED APPLICATIONS

This is a continuation of, and claims a benefit of priority from U.S. patent application Ser. No. 15/979,863, filed May 15, 2018, entitled "SYSTEMS AND METHODS FOR GENERATING AND COMMUNICATING ENHANCED PORTABLE DOCUMENT FORMAT FILES," which is continuation of, and claims a benefit of priority from U.S. patent application Ser. No. 12/022,362, filed Jan. 30, 2008, issued as U.S. Pat. No. 10,003,701, entitled "SYSTEMS AND METHODS FOR GENERATING AND COMMUNICATING ENHANCED PORTABLE DOCUMENT FORMAT FILES," all of which are fully incorporated by reference herein for all purposes.

BACKGROUND

Facsimile (fax) technology has been a successful means to transmit documents electronically. With the emergence of publicly accessible data networks and electronic mail (e-mail) applications, it appeared as though fax communications would be rapidly replaced by e-mail. However, it is now clear that the two technologies will co-exist for some time.

A fax server uses specialized interface circuits for converting information communicated by users of a fax service. When a document arrives at the fax server, the fax server converts the document into a format that is suitable for transmission over the PSTN. Thereafter, the fax server sends the converted document over the PSTN via its dedicated interface circuits. Conversely, for a fax arriving at the fax server, the fax server identifies the destination user, converts the incoming fax transmission into a format suitable for delivery to the destination user, and sends the converted document to the destination user over the internal IP network.

In a common enterprise network, the users are not only connected to the fax server via the internal internet protocol (IP) network, but are also connected to an internetworking gateway, which connects the internal IP network to the Internet. The gateway allows a user to communicate electronically with other parties connected to the Internet. Such electronic communications may include store-and-forward messages (e.g., e-mail), real time one-way communications (e.g., live TV), real time two-way communications (e.g., Internet telephony, etc.).

The gateway is typically connected to an Internet Service Provider (ISP). The connection between the gateway and the ISP or the PSTN is typically established via dedicated T1/E1 lines or in some cases optical fiber, similar to the connection between the fax server and the PSTN. Thus, it is apparent that a fax server can be coupled to one or more users by placing the fax server in a local area network (i.e., on the user side of the gateway) or almost anywhere on the world wide web, where the fax server can be accessed and used by multiple subscribers across one or more enterprises.

The portable document format (PDF) is a file format created by Adobe Systems for document exchange. The PDF is used for representing documents in a device-independent and display resolution-independent document format. Each PDF file encapsulates a description of a document that includes the images, and two-dimensional vector graphics that define the document.

Conventional fax-to-email services send and receive fax documents in tagged-image file format (TIFF), which is devoid of text, font, format and other information, and convert the images into PDF files that are attached to an email message addressed to the intended recipient of the fax. Accordingly, the PDF file is limited to the image information sent and received from the original fax.

Accordingly, it would be desirable to develop systems and methods that overcome these shortcomings in the integration and flexibility of fax and e-mail functionality.

SUMMARY

Systems and methods that selectively convert facsimile and e-mail messages are invented and disclosed. A server uses a user profile to identify when a facsimile intended for a user should be converted to an enhanced portable document format (EPDF) file. In this embodiment, an EPDF file includes information derived from a received facsimile message in addition to the image information. The user profile contains information that is used by the facsimile server when converting the facsimile message. The facsimile server generates the EPDF file, which is saved or otherwise associated with the original facsimile message, as directed by one or more indicators from the user profile. In accordance with the presence or absence of one or more indicators, the server generates EPDF files that may contain searchable text, be password protected and encrypted, or pre-configured to receive comments from an appropriately configured editor. The server forwards the EPDF file as an attachment to an electronic mail message addressed to the user.

In another embodiment, the server uses a user profile to identify when an electronic mail message from a user should be used to generate an EPDF file. In this embodiment, the EPDF file includes information from the electronic mail message as well as one or both of a representation of a signature and a representation of a repositionable note. The EPDF file is converted to a facsimile format before being communicated to a designated destination coupled to the public-switched telephone network.

One embodiment of a method for converting documents includes the following steps: receiving a facsimile via the public-switched telephone network, generating an EPDF file that includes information in addition to image information and communicating the EPDF file to an e-mail server.

Another embodiment of a method for converting documents includes the following steps: receiving a file, generating an EPDF file that includes information from the file and at least one of a representation of a signature and a representation of a repositionable paper note, converting the EPDF file to image information and communicating the image information in accordance with a destination identifier via the public-switched telephone network (PSTN).

An embodiment of a facsimile processing system includes a PSTN interface, a packet-switched network interface, a simple mail transfer protocol (SMTP) server, an input agent, a job processor and a translator. The PSTN interface couples the input agent, job processor, translator, and SMTP server to the PSTN. The packet-switched network interface couples the SMTP server to one or more electronic mail (e-mail) clients. The input agent identifies the incoming facsimile format message and forwards the same to the job processor. The job processor determines whether the facsimile should be processed by the translator or forwarded to a raster processor that converts image format information to a PDF file. When the facsimile format message is received by the translator, the translator generates an EPDF file in accordance with one or more indicators in a user profile, the EPDF file comprising information other than image information. The EPDF file is sent as an attachment in an e-mail message to the intended recipient of the facsimile.

Another embodiment of a facsimile processing system includes a PSTN interface, a packet-switched network interface, a server, and a translator. The packet-switched network interface couples the server to one or more users via one or more networks. The PSTN interface couples the translator to the PSTN. In accordance with a user profile, the translator generates and forwards an EPDF file to the PSTN interface. The EPDF file includes information from a received e-mail message as well as one or more of a representation of a signature and a representation of a repositionable paper note. The PSTN interface communicates the information from the EPDF file via a facsimile format over the PSTN.

An embodiment of a method for processing documents includes the following steps: receiving a facsimile format message intended for a communication service customer defined by a destination identifier, determining if a user profile associated with the destination identifier includes an indicator of the user's desire to receive an EPDF representation of the facsimile format message, when the user profile includes the indicator of the user's desire to receive an EPDF representation of the facsimile format message, preparing instructions for converting the image information in the facsimile format message in response to a set of format options, communicating the instructions to a translator configured to generate an EPDF file from the facsimile format message, the EPDF file comprising information other than image information and communicating the EPDF file as an attachment to an e-mail message addressed to the user.

Other devices, methods, features and advantages will be or will become apparent to one skilled in the art upon examination of the following figures and detailed description. All such additional devices, methods, features and advantages are defined and protected by the accompanying claims.

BRIEF DESCRIPTION OF THE DRAWINGS

The present systems and methods for generating and communicating messages, as defined in the claims, can be better understood with reference to the following drawings. The components within the drawings are not necessarily to scale relative to each other; emphasis instead is placed upon clearly illustrating the elements, features and principles involved in generating and communicating enhanced portable document format files from facsimile and e-mail messages.

DETAILED DESCRIPTION

Figure 1:
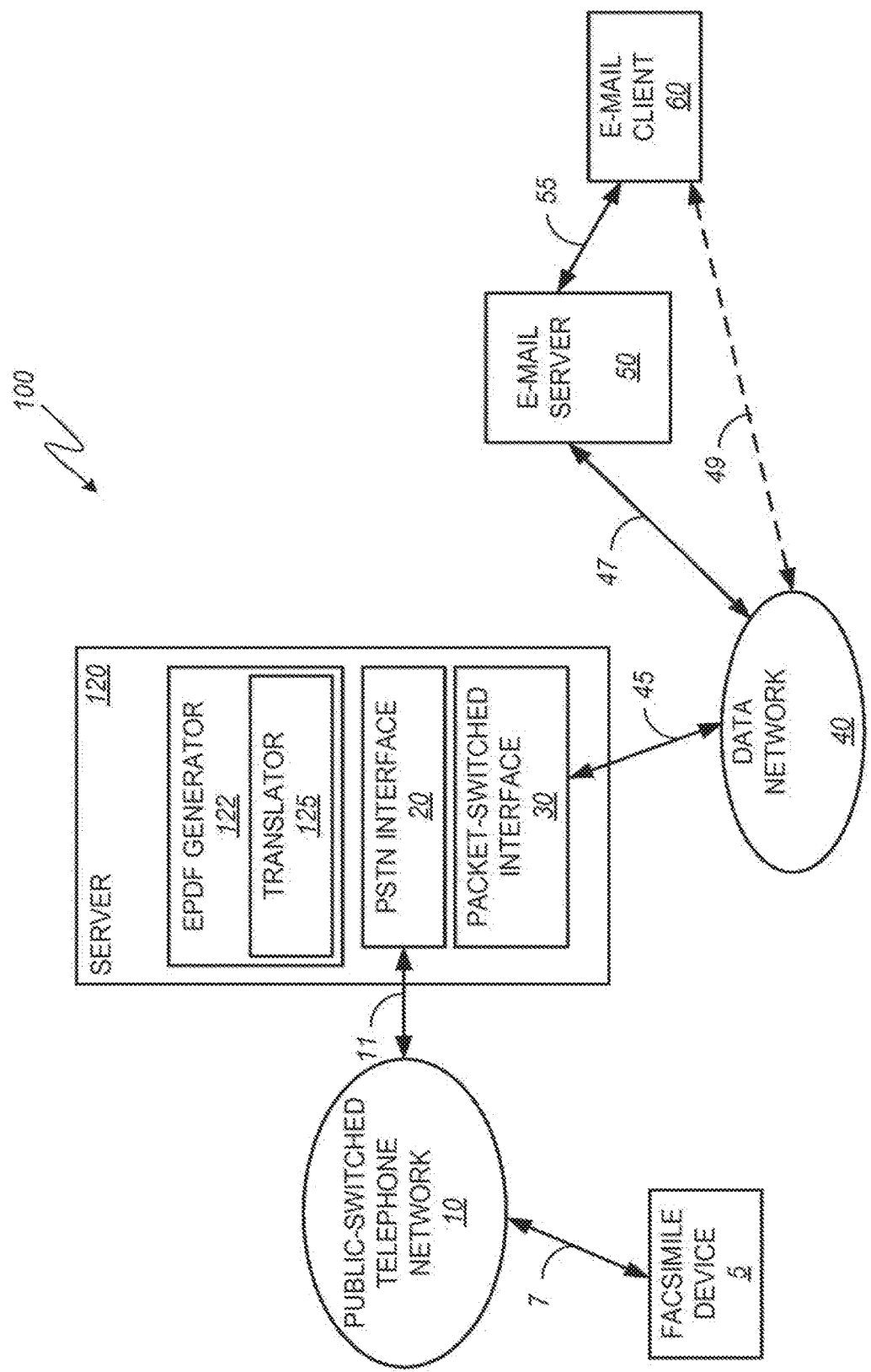
FIG. 1 is a functional block diagram illustrating an embodiment of an example network environment.

A message processing system coupled to a data network receives facsimile or fax messages from the PSTN. Fax messages are received at a fax to e-mail server coupled to both the PSTN and a data network. The fax to e-mail server converts the received image format file to an enhanced portable document format (EPDF) file in accordance with a user or customer profile. An EPDF file includes information in addition to raster image information. For example, an EPDF file may include searchable text, a secure password, configuration information that enables a reader to add comments to the file, among other attributes not found in a conventional two-dimensional PDF file.

A user of the fax to e-mail service is associated with a customer identifier that is used to identify the user when the user interacts with the fax to email server or when a facsimile message designated for delivery to the user is received and processed by the facsimile processing system. A profile management interface enables a user to select one or more options for configuring EPDF file representations of received facsimile messages. A profile store retains a record of the selected options for each user. An input agent identifies an incoming facsimile message. As part of the identification process, the input agent uses the destination phone number to identify the designated recipient of the facsimile message. The input agent forwards the tagged image file format (TIFF) version of the received facsimile message along with the destination phone number to a job processor. The job processor retrieves the user profile associated with the designated recipient of the facsimile message and distributes the facsimile or job in accordance with the presence or lack thereof of an indicator in the user profile. When the user has indicated in the profile that an EPDF file is not desired, the job processor forwards the TIFF version of the received facsimile message to a two-dimensional raster conversion process that produces a two-dimensional PDF version of the facsimile. Otherwise, when the user has indicated in the profile that an EPDF file is desired, the job processor forwards the TIFF version of the received facsimile message to a translator along with instruction consistent with information in the user profile.

In turn, the translator processes the TIFF version of the facsimile message in accordance with the instruction received from the job processor. In accordance with the instruction, the translator generates an EPDF file that contains one or more of searchable text, password protection with data encryption, and metadata that permits subsequent readers to add comments to the EPDF file using an appropriately configured editor. In addition, the translator generates an EPDF file that locates signature information wherever a user or subscriber desires within the document.

Once the EPDF file is generated, the EPDF file and the original TIFF version of the received facsimile message are available to be sent as attachments via an e-mail server coupled to the facsimile server via the data network. The attachments can be sent via separate e-mail messages or together in a single e-mail message. Alternatively, only the EPDF file may be forwarded as an attachment to the e-mail message.

Generally, a user or subscriber to the system will choose or otherwise identify a default language. When the user has indicated that they wish to receive searchable text with the EPDF file, the facsimile to e-mail server will perform a character recognition process on the image information in a received facsimile. The particular character recognition routine used by the facsimile to-e-mail server will depend on the identified default language. When the user receives a facsimile written in a different language than the default language, as determined by the default character recognition process, or by the user, the user is provided a link in the inbound mail message to go to an interface that enables the user to direct the facsimile to e-mail server to analyze the message using a different character recognition process suitable for the language used by the author of the facsimile message. The link is encoded with information that permits the user to log into the interface and be presented with a reprocess configuration page to generate a reprocess request. Once the request is completed, the interface forwards a new job request to the server to perform a new translation of the original facsimile format message.

The message processing system further receives e-mail messages that are converted and delivered in a facsimile format to a destination device via the PSTN. The e-mail messages are received at the fax to e-mail server from users coupled to the data network. The fax to e-mail server converts the received e-mail message to an EPDF file in accordance with the user or customer profile. The EPDF file includes information from the e-mail message as well as at least one of a representation of a signature and a representation of a repositionable note. For example, the EPDF file may include a signature along with configuration information that enables a raster conversion process to create a facsimile format message that when received and decoded by the recipient includes the identified signature at a default location or at a location designated by the sender of the e-mail message. The signature, repositionable note and a desired location for each can be communicated to the server in various ways. For example, the signature and desired location of the same can be communicated via an interface application provided to or otherwise accessible to users of a communication service. Repositionable notes and the desired location of each can be communicated via the interface application or a separate application. In other embodiments, the signature and repositionable notes as well as location information for each can be encoded in the body of an e-mail message or communicated via attachments to an e-mail message.

Having generally described operation of the systems and methods for generating and communicating messages, various additional embodiments will be described with respect to FIGS. 1-9. FIG. 1 is a functional block diagram illustrating an embodiment of an example network environment. Network environment 100 includes facsimile device 5, PSTN 10, server 120, data network 40, e-mail server 50 and e-mail client 60. The facsimile device 5 is coupled to PSTN 10 via link 7. The facsimile device 5 is any machine, device or combination of devices capable of reproducing a document communicated via the PSTN. The server 120 is coupled to PSTN 10 via link 11 and data network 40 via link 45. E-mail server 50 is coupled to data network 40 via link 47. E-mail client 60 is coupled to e-mail server 50 via link 55. In addition, e-mail client 60 is coupled to data network 40 via link 49. Each of the illustrated communication links with data network 40, such as link 45, link 47, and link 49 may be partially or entirely enabled wirelessly. Link 49, which couples data network 40 to e-mail client 60 by bypassing e-mail server 50, like the other communication links, can be partially or entirely enabled via wireless communication protocols and suitably configured hardware. Similarly, link 7, which couples the facsimile device 5 to PSTN 10, may be partially or entirely enabled wirelessly.

E-mail server 50 is a data network coupled message transfer agent (MTA) or a system of MTAs, used to route e-mail and serve e-mail, by storing e-mail messages and supporting customer access using post-office protocol (POP), internet message access protocol (IMAP) or other e-mail protocols.

E-mail client 60 is an application program operative on a user device. The e-mail client 60 is configured to send, receive and manage e-mail messages with and without attached files. As with communication links coupled to data network 40, link 55 may be partially or entirely enabled wirelessly.

Server 120 includes PSTN interface 20, packet-switched interface 30 and an enhanced portable document format (EPDF file) generator 122. PSTN interface 20 makes the necessary data and signal translations to send and receive data including facsimile signal transmissions via link 11 and PSTN 10. Similarly, packet-switched interface 30 makes the necessary data and signal translations to send and receive data packets via link 45 and data network 40. EPDF generator 122 includes a processor and memory within translator 125 to enable enhanced processing of incoming facsimile and e-mail messages. While EPDF 122 is illustrated in an integrated configuration with PSTN interface 20 and packet-switched interface 30 within server 120, it should be understood that various functions and data stores associated with server 120 may be distributed in other data network coupled devices as may be desired.

Figure 2:
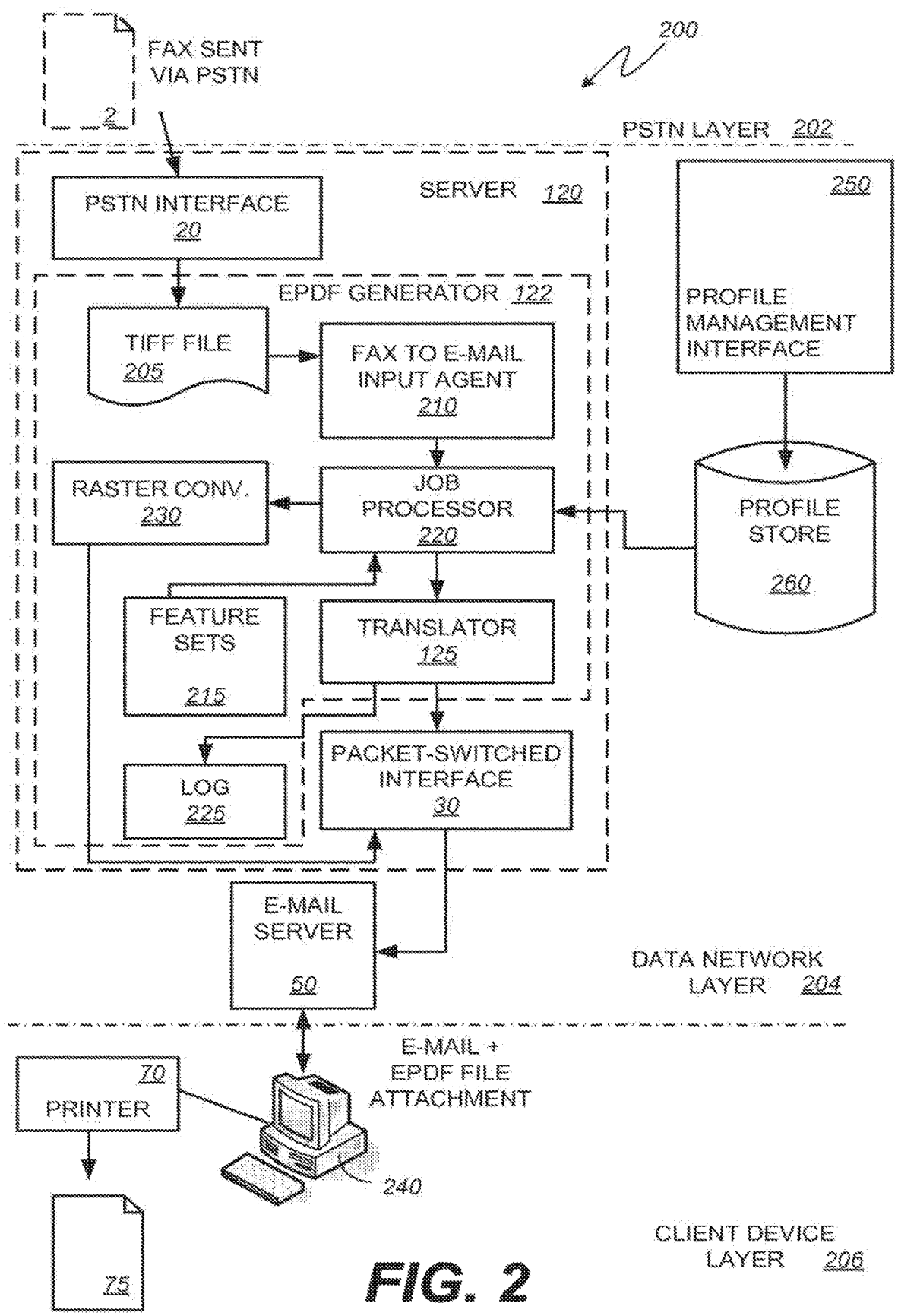
FIG. 2 is a functional block diagram illustrating inbound fax message processing through the network environment of FIG. 1.

FIG. 2 is a functional block diagram illustrating inbound facsimile message processing through the network environment 100 of FIG. 1. Diagram 200 illustrates the processing of an incoming fax message from the top to the bottom of the figure.

Each incoming facsimile message traverses PSTN layer 202, data network layer 204 and client device layer 206, in that order.

As shown in FIG. 2, fax message 2 is received by PSTN interface 20 of server 120 and is forwarded to the EPDF generator 122, which generates a TIFF file 205. The TIFF file 205 is received by input agent 210, which forwards a processing request including TIFF file 205 to job processor 220.

As also shown in FIG. 2, EPDF generator 122 is coupled to an external profile store 260. Profile store 260 includes a database or other arrangement of user specific data that defines how the server 120 will process incoming and perhaps outgoing facsimile messages from a user or customer of the service. Profile store 260 receives customer specific identification and configuration information from profile management interface 250. In the illustrated embodiment, profile management interface 250 and profile store 260 are depicted as devices external to the server 120 and EPDF generator 122. It should be understood that either or both of profile management interface 250 and profile store 260 may be integrated with PSTN interface 20, packet-switched interface 30, fax to e-mail input agent 210, job processor 220, translator 125, raster converter 230, feature sets 215, log 225, and perhaps other functions and stores as may be desired.

Job processor 220 retrieves a user profile from profile store 260 that when applied to a feature set 215 instructs the job processor whether to direct the TIFF file 205 to a raster converter 230 or to translator 125 to generate an EPDF file. When the combination of the user profile and feature set indicate that an image only PDF file is desired, job processor 220 forwards TIFF file 205 to raster converter 230. The raster converter 230 generates a two-dimensional or image only PDF version of the TIFF file 205 and communicates the PDF file to packet-switched interface 30, which in turn forwards the PDF to e-mail server 50. Alternatively, when the combination of the user profile and feature set indicate that an EPDF file is desired, that is, additional non-image information is desired to be forwarded with the facsimile, job processor 220 forwards TIFF file 205 to translator 125 to generate the EPDF file.

Translator 125 includes a scan library, which enables the translation of the TIFF file 205 to a PDF. The scan library supports the modification of properties such that EPDF files contain the appropriate security settings to allow a reader to add comments to an EPDF file. The scan library further includes an application interface that enables the creation of a searchable EPDF file from a TIFF file. In addition, the scan library includes an application interface for generating a password protected EPDF file with encrypted data. The scan library or other modules within translator 125 apply one or more federal information processing standard approved algorithms for protecting data. Moreover, the scan library or applications in cooperation with the scan library enable a user to identify where signature information should be applied in a particular document. As will be explained in greater detail, a user profile includes one or more indicators that are forwarded to the translator 125 to direct the translator 125 to apply one or more of the above described interfaces during the creation of an EPDF file. When an EPDF file is desired and created in response to an inbound facsimile message, the translator 125 associates the EPDF file with TIFF file 205 and records an entry in log 225. One or more entries in log 225 can be used to track usage or bill a customer of the communication service. As part of the file association, the translator 125 may save or otherwise store TIFF file 205 with the EPDF file.

Whether the server 120 generates an image only PDF file using raster converter 230 or an EPDF file via the translator 125, the resulting file is forwarded via packet-switched interface 30 to e-mail server 50. E-mail server 50 is a computing device that uses the simple mail transfer protocol (SMTP) to communicate messages to customers or users of the communication service. While e-mail server 50 is illustrated as a separate computing device, it should be understood that e-mail server 50 may be integrated with PSTN interface 20, packet-switched interface 30, fax to e-mail input agent 210, job processor 220, translator 125, raster converter 230, feature sets 215, log 225, and perhaps other functions and stores as may be desired.

In response, to a command from client computer 240, e-mail server 50 forwards an appropriately addressed e-mail message along with the desired PDF or EPDF as an e-mail message attachment. An e-mail client operable on client computer 240 and configured with an appropriate PDF reader can be used to open and read the information in the PDF attachment. An e-mail client operable on client computer 240 and configured with appropriate application software can be used to open, search, review and comment on the information contained in an EPDF attachment as desired. Printer 70 coupled to client computer 240 is available to render a hard copy of the received facsimile message.

Although the illustrated embodiment of the client device layer 206 includes client computer 240, it should be understood that other devices such as a personal data assistant or a cellular phone with appropriate executables, communication and local interfaces may be substituted for client computer 240.

Figure 3:
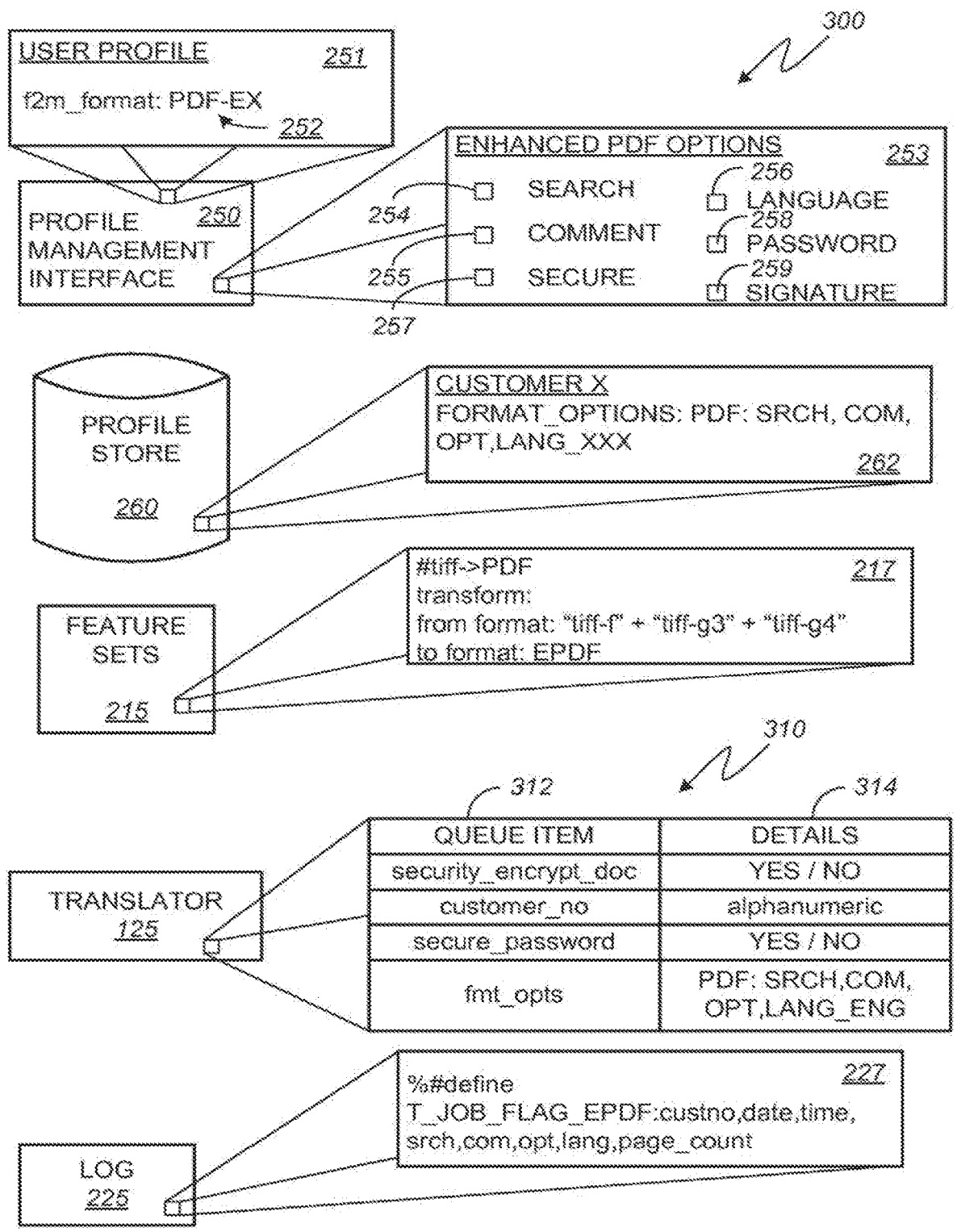
FIG. 3 is a schematic diagram illustrating embodiments of a profile management interface, user profile, feature set, translation instructions and a log entry in a facsimile processing system integrated in the network environment of FIG. 1.

FIG. 3 is a schematic diagram illustrating embodiments of a profile management interface, user profile, feature set, translation instructions and a log entry in a facsimile processing system integrated in the network environment of FIG. 1. Diagram 300 shows that the profile management interface 250 is capable of receiving, storing and processing a user profile 251. The user profile 251 includes a keyword 252 that in the illustrated embodiment includes a data field with the value "PDF-EX," which indicates that the user associated with the user profile 251 desires the server 120 to generate EPDF files when a facsimile is addressed to the user.

Diagram 300 further shows that the profile management interface 250 generates selection panel 253, which enables a user to select one or more EPDF options. The selection panel 253 may be exposed to users of the facsimile to e-mail service via a web browser or a client application operable on a client designated device. Selection panel 253 includes checkbox 254, checkbox 255, checkbox 256, checkbox 257, checkbox 258 and checkbox 259. Checkbox 254 indicates the user's desire to receive an EPDF file with searchable text. Checkbox 255 indicates the user's desire to receive an EPDF file that is pre-configured to enable a reader of the file to enter and save comments to the EPDF file. Checkbox 256 indicates the user's desire to select a particular language from a list of available languages to use when applying a character recognition process against the image information in the received facsimile message. When checkbox 256 is selected, selection panel 253 is configured to prompt the user to enter or otherwise select a default language to be used when generating a searchable text version of the image information in the received facsimile message. Checkbox 257 indicates the user's desire to receive an EPDF file that includes encrypted data and is secured by a communicated password. Checkbox 258 indicates the user's desire to enter or edit a previously entered password to use when securing the EPDF file. When checkbox 258 is selected, selection panel 253 is configured to prompt the user to enter a password that can be used to view the contents of a subsequently generated EPDF file. Alternatively, selection panel 253 may be configured to display a reminder to the user that a previously stored password associated with the user's account information will be required to view the contents of subsequently generated EPDF files. Checkbox 259 indicates the user's desire to insert signature information into the document when signature information is available. When checkbox 259 is selected, selection panel 253 is configured to prompt the user to enter location information identifying the specific location in the document where the user wants the signature information to be inserted in a subsequently generated EPDF file. Alternatively, selection panel 253 may be configured to display a reminder to the user that a previously stored location associated with the user's account information will be used to locate the signature information on a subsequently generated EPDF file.

Diagram 300 further shows that profile store 260 includes a customer specific record 262. In the illustrated embodiment, customer specific record 262 includes a set of optional flags including "SRCH," "COM," "OPT," and "LANG_XXX" appended to a profile keyword labeled "format_options." Each of the optional flags when applied in a later instruction will communicate the user's desire for a specific attribute or feature to be added to a subsequently created EPDF file or files. The SRCH flag indicates that the EPDF file should be generated using an optical character recognition process to create searchable text metadata that is added to the file. The COM flag indicates that the EPDF file should be configured with an option that permits a subsequent reader of the file to enter comments that can be saved to the EPDF file. The OPT flag indicates that the EPDF file should be encrypted and password protected. The LANG flag indicates that the EPDF file should be configured by applying an identified optical character recognition process suited to characters used in a particular language to a received facsimile message.

Diagram 300 further shows that feature sets 215 include an instruction 217 for routing a facsimile format to EPDF translation task to translator 125. In the illustrated embodiment, instruction 217 includes an alphanumeric string that indicates that incoming TIFF files in any of three formats should be converted to an EPDF file. When a received TIFF file is forwarded to translator 125, the translator 125 applies items from queue list 310 to successfully generate the desired EPDF file for a designated customer or user of the facsimile to e-mail service. In the illustrated embodiment, queue list 310 includes a set of four queue items 312 that are each associated with a detail field 314. For example, a first queue item, "security_encrypt_doc," is associated with a detail of "YES" or "NO" with a default value of "NO." The second queue item, "customer_no," is associated with a unique alphanumeric identifier. The customer identifier can be used to determine the appropriate password to be used for encrypting an EPDF file. The third queue item, "secure_password," is associated with a detail of "YES" or "NO" with a default value of "NO." The fourth queue item, "fmt_opts," is associated with the value "PDF:SRCH,COM, OPT,LANG_XXX." This value comes from the profile keyword. Not all comma separated values to the right of PDF: need to be included.

Diagram 300 also shows that log 225 includes an entry 227 for tracking and billing purposes. In the illustrated embodiment, entry 227 includes an entry with fields for customer number, date and time the EPDF file was created as well as a list of the user selectable options that were applied and a page count. Consequently, such a log entry can be used to track usage and to apply one or more fee schedules when generating a bill for the facsimile to e-mail service.

It should be understood that a preliminary registration interface may be presented to potential subscribers to the service. The preliminary registration interface is arranged to collect user specific information and offer one or more pricing plans in association with the user's selected options.

Generally, in terms of hardware architecture, the above-described server 120, profile management interface 250, profile store 260, e-mail server 50 and client computer 240 each include respective processors and memories, as well as local and external interfaces. Each respective combination is arranged such that the processor is in communication with the memory via the local interface. The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, power and/or data connections to enable appropriate communications among the aforementioned components.

The respective processors are hardware devices for executing software, particularly that stored in the associated memory devices. The processors can be any custom made or commercially available processor configured to execute software instructions.

The respective memories can include any one or a combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the respective memories may incorporate electronic, magnetic, optical, and/or other types of storage media. Each memory can have a distributed architecture, where various components are situated remote from one another, but still accessible via the associated processor.

One or more programs, each of which comprises an ordered listing of executable instructions for implementing logical functions can be stored in the respective memories. In addition, each of the memories may include an operating system that essentially controls the execution of the illustrated functions and perhaps additional functions such as scheduling, input-output control, file and data management, memory management, communication control and related services.

When implemented as source programs, the programs are translated via a compiler, assembler, interpreter, or the like, to operate properly in connection with the operating system.

The external interfaces perform signal conditioning and data format conversions to enable communication through one or both of wired and wireless networks. Wired interfaces are compatible with Ethernet standards and TCP/IP. Wireless interfaces are compatible with one or more of the infrared data association (IrDA) and the Institute of Electrical and Electronics Engineers (I.E.E.E.) 802 family of wireless data communication protocols. It should be understood that other data-network interfaces compatible with other communication standards and protocols may also be used.

Additional interfaces and mechanisms can be coupled to each of the server 120, profile management interface 250, profile store 260, e-mail server 50 and client computer 240 to configure these devices. These mechanisms may include browsers or other software (not shown) configured to expose configuration parameters, data tables and other information to external devices. Moreover, the local interface can be configured with one or more man-machine interfaces such as a keyboard, a display, a printer, etc. Such human-machine interfaces may include touch sensitive displays or the combination of a graphical-user interface and a controllable pointing device such as a mouse to enable an operator to configure or otherwise modify server 120, profile management interface 250, profile store 260, e-mail server 50 and client computer 240.

When instructions and data elements are implemented in software it should be noted that these software elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where one or more of instructions operable within server 120, profile management interface 250, profile store 260, e-mail server 50 and client computer 240 are implemented in hardware, the instructions can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

Figure 4:
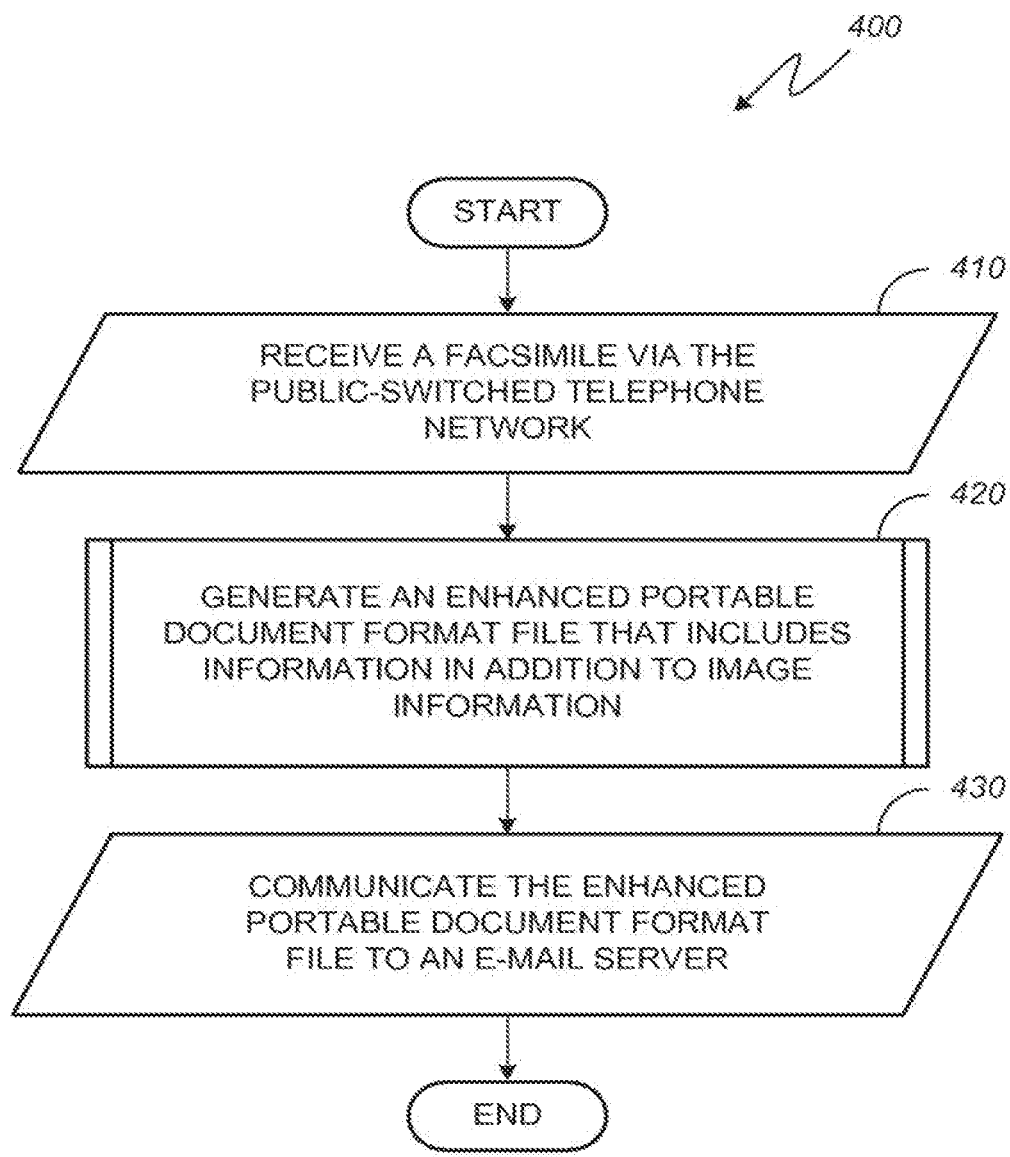
FIG. 4 is a flow diagram illustrating an embodiment of a method for converting documents.

FIG. 4 is a flow diagram illustrating an embodiment of a method for converting documents. The flow diagram of FIG. 4 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 400 begins with block 410 where a facsimile message is received via the public-switched telephone network. Thereafter, in block 420 an EPDF file that includes information in addition to image information is generated. Next, in block 430, the EPDF file is communicated to an e-mail server.

Figure 5:
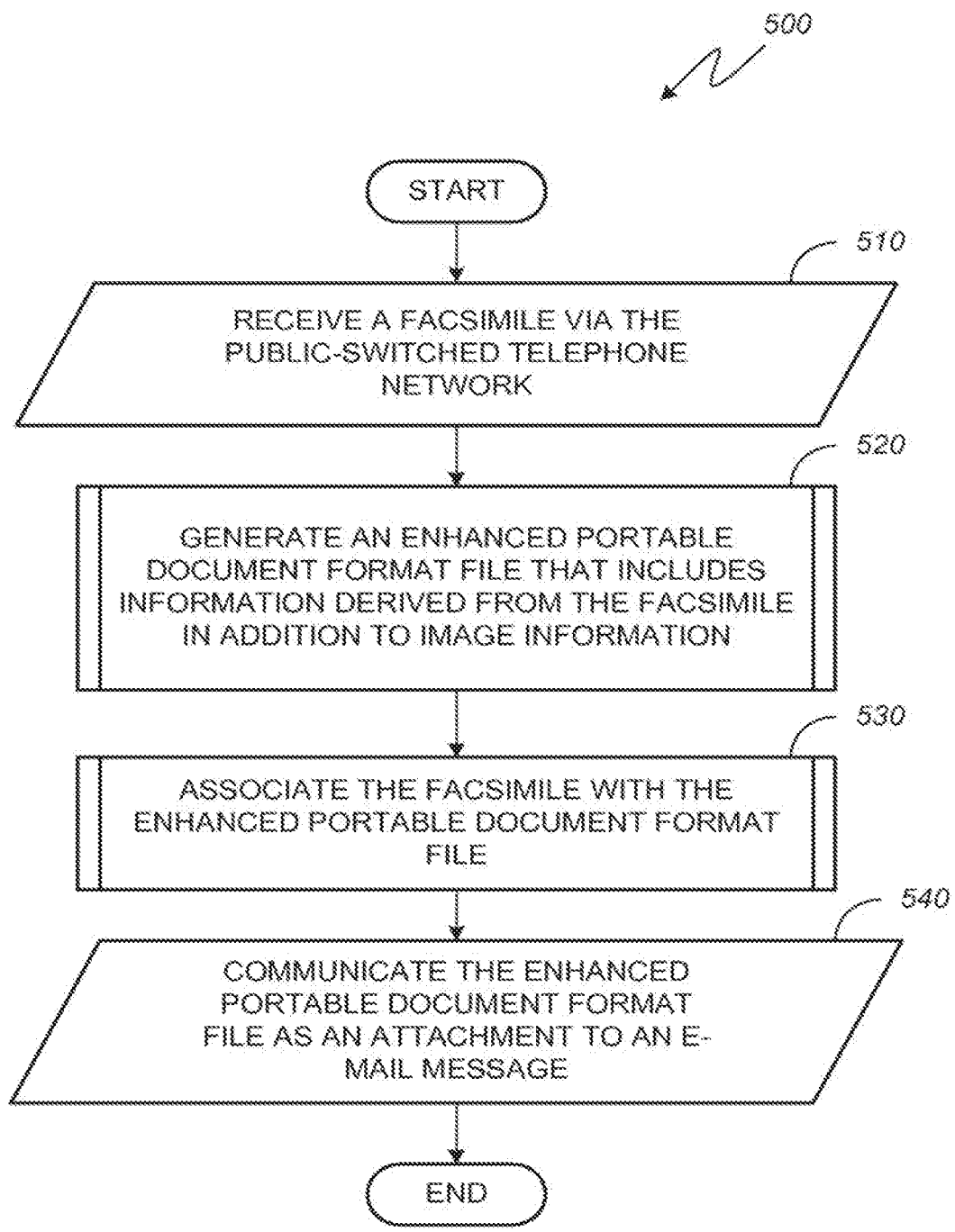
FIG. 5 is a flow diagram illustrating an embodiment of an alternative method for converting documents.

FIG. 5 is a flow diagram illustrating an embodiment of an alternative method for converting documents. The flow diagram of FIG. 5 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 500 begins with block 510 where a facsimile message is received via the public-switched telephone network. Thereafter, in block 520 an EPDF file that includes information in addition to image information is generated. Next, in block 530, the facsimile information is associated with the EPDF file. In block 540, the EPDF file is communicated as an attachment to an e-mail message addressed to the recipient of the facsimile message.

Figure 6:
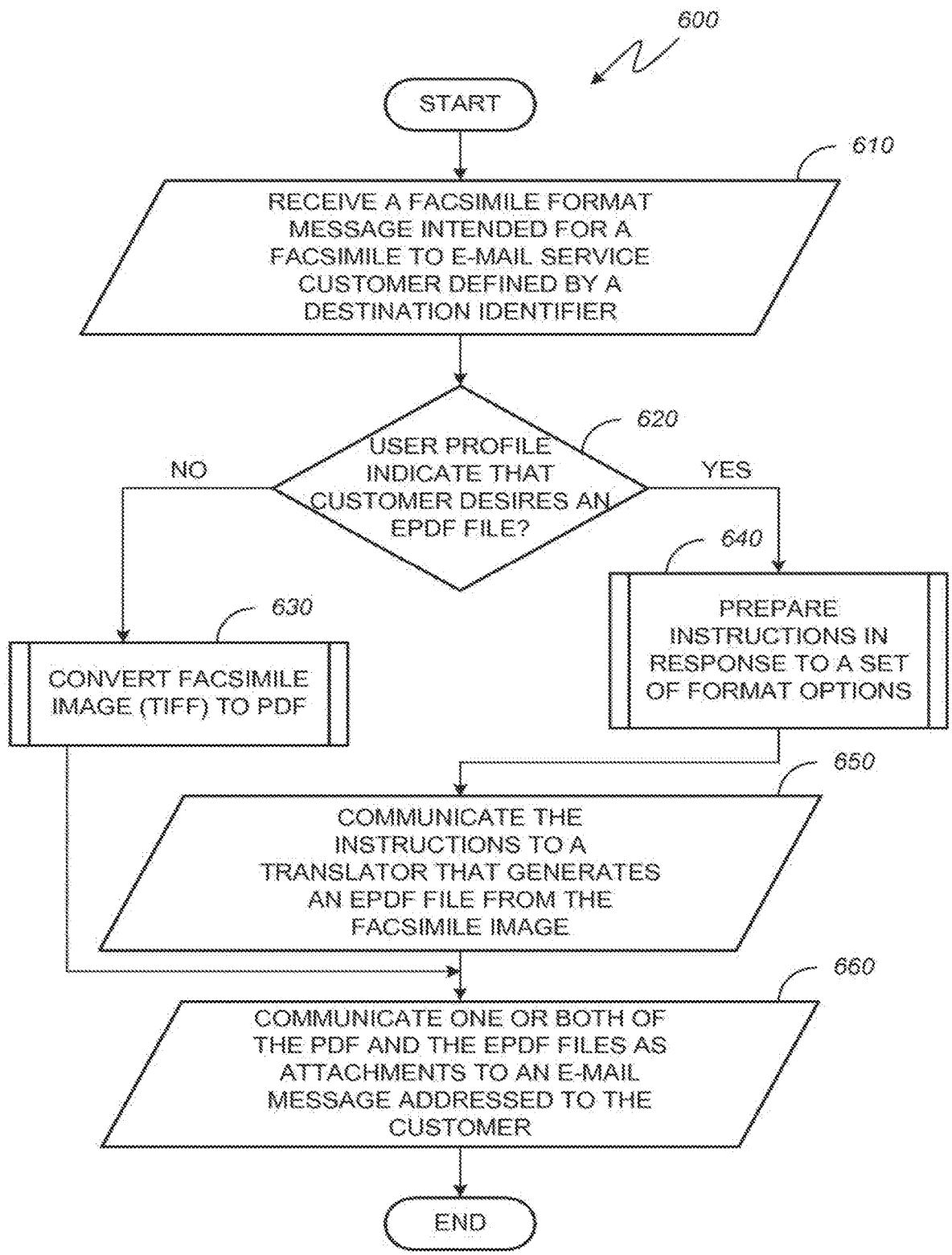
FIG. 6 is a flow diagram illustrating an embodiment of a method for processing documents.

FIG. 6 is a flow diagram illustrating an embodiment of a method for processing documents. The flow diagram of FIG. 6 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 600 begins with input/output block 610 where a facsimile message intended for a communication service customer defined by a destination identifier is received. Thereafter, as shown in decision block 620, it is determined whether a user profile associated with the customer indicates that the customer desires an EPDF file. When it is the case that the user profile indicates that an EPDF file is not desired, as shown by the flow control arrow labeled "NO," exiting decision block 620, processing continues with block 630 where the facsimile image is converted to a two-dimensional (image only) PDF. As further shown by the flow control arrow exiting block 630, the two-dimensional PDF is forwarded to block 660 for attachment in an e-mail message to the customer.

Otherwise, when it is the case that the user profile indicates that an EPDF file is desired, as shown by the flow control arrow labeled "YES," exiting decision block 620, processing continues with block 640 where instructions are prepared in response to a set of format options. Thereafter, as indicated by input/output block 650, the instructions are communicated to a translator configured to generate an EPDF file from the facsimile image in accordance with the instructions. Next, as shown in block 660, the EPDF file is sent as an e-mail attachment to the customer. An e-mail message to the customer will also include the two-dimensional (image only) PDF version of the facsimile message as a default configuration. Optionally, a customer may request and receive only the EPDF file attached to the e-mail message.

Figure 7:
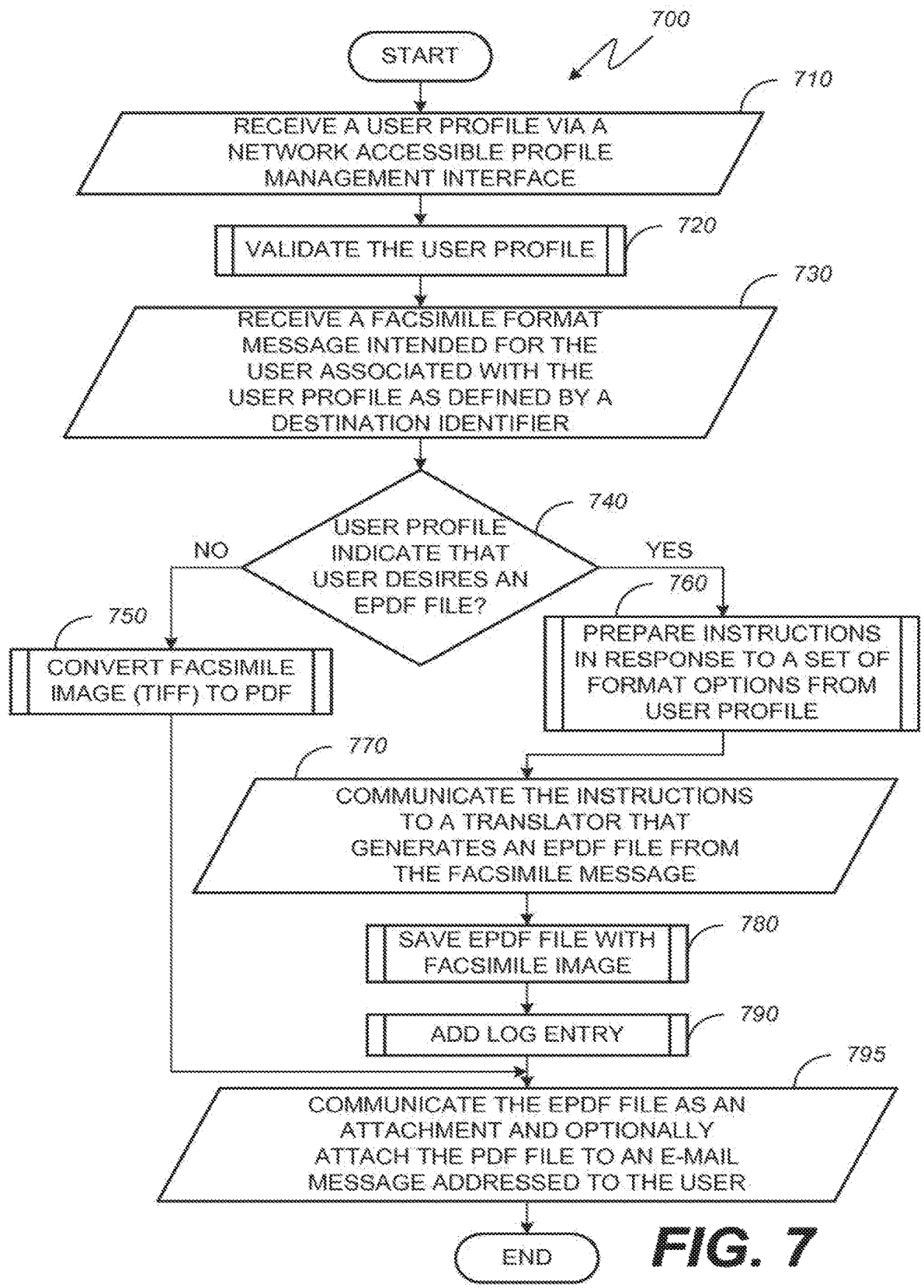
FIG. 7 is a flow diagram illustrating an embodiment of an alternative method for processing documents.

FIG. 7 is a flow diagram illustrating an embodiment of an alternative method for processing documents. The flow diagram of FIG. 7 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 700 begins with input/output block 710 where a user profile is received via a network accessible profile management interface. As described above, the user profile includes a keyword 252 that defines the processing to be performed on facsimile messages addressed to the user. In block 720, the profile management interface or a recipient of the profile, such as server 120 validates the user profile received in block 710. At any time thereafter, processing continues with input/output block 730 where a facsimile format message (e.g., a TIFF file) intended for the user associated with the user profile as defined by a destination identifier is received. Thereafter, as shown in decision block 740, it is determined whether a user profile associated with the user indicates that the user desires an EPDF file. When it is the case that the user profile indicates that an EPDF file is not desired, as shown by the flow control arrow labeled "NO," exiting decision block 740, processing continues with block 750 where the facsimile image is converted to a two-dimensional (image only) PDF. As further shown by the flow control arrow exiting block 750, the two-dimensional PDF is forwarded to block 795 for attachment in an e-mail message to the user.

Otherwise, when it is the case that the user profile indicates that an EPDF file is desired, as shown by the flow control arrow labeled "YES," exiting decision block 740, processing continues with block 760 where instructions are prepared in response to a set of format options from the user profile. Thereafter, as indicated by input/output block 770, the instructions are communicated to a translator configured to generate an EPDF file from the facsimile image in accordance with the instructions. Next, as shown in block 780, the EPDF file is saved or otherwise associated with the facsimile image. In block 790, an entry is added to a log to track usage for management and billing purposes. Last, as shown in input/output block 795, the EPDF file, and optionally the PDF file, is sent as an attachment to an e-mail message addressed to the user.

Figure 8:
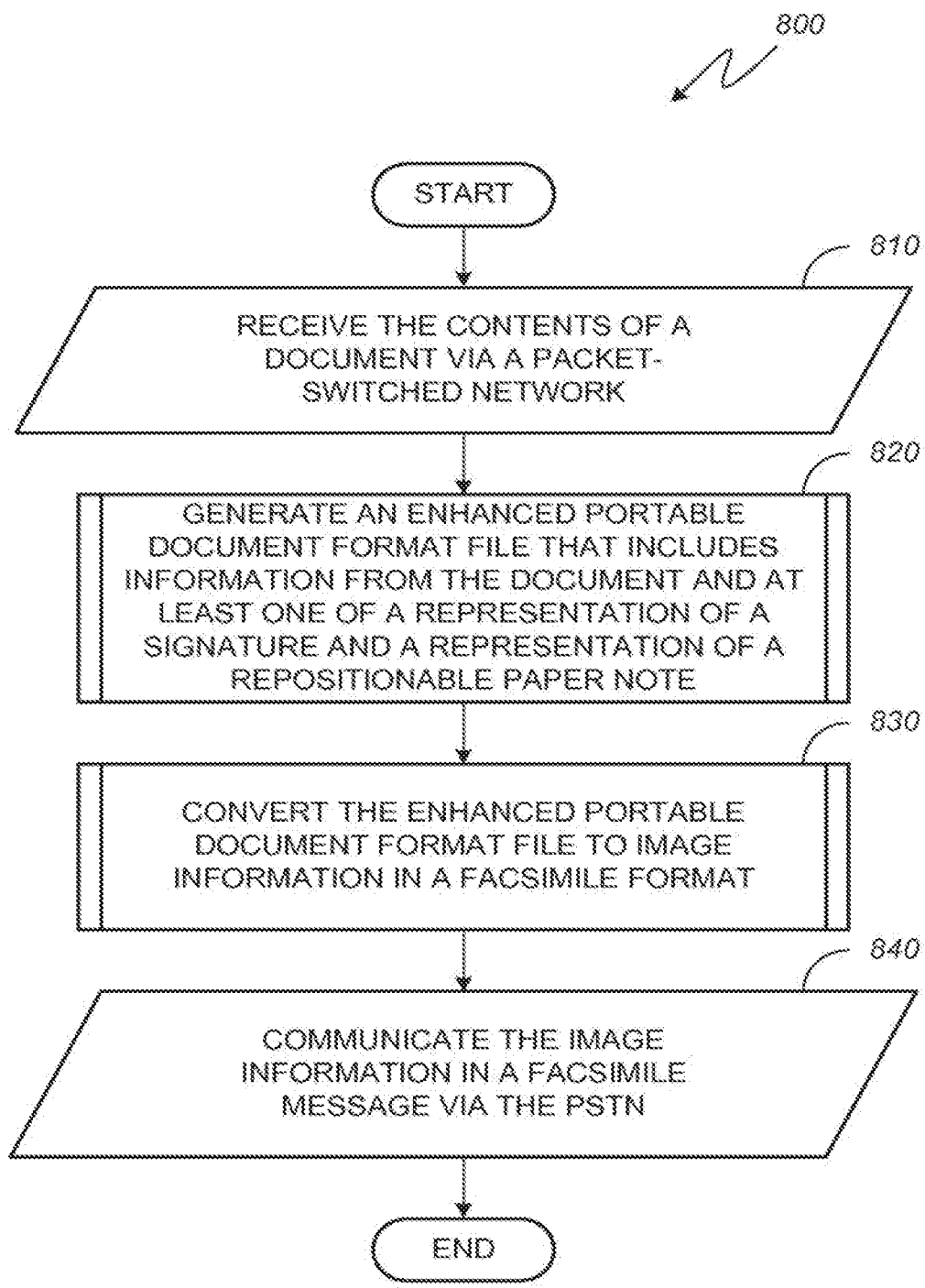
FIG. 8 is a flow diagram illustrating an embodiment of a method for processing documents functional block diagram illustrating outbound fax message processing through the network environment of FIG. 1.

FIG. 8 is a flow diagram illustrating an embodiment of another method for converting documents. The flow diagram of FIG. 8 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 800 begins with input/output block 810 where the contents of a document are received via a packet-switched network. In some embodiments, the document is communicated in the body of an e-mail message. In other embodiments, the document is communicated in an attachment to an e-mail message. Thereafter, in block 820 an EPDF file that includes information from the document and at least one of a representation of a signature and a representation of a repositionable paper note is generated. Next, in block 830, the EPDF file is converted into image information in a facsimile format. Thereafter, as indicated in input/output block 840, the image information including the document and one or more of the signature and the contents of the repositionable note are communicated to a destination facsimile device via the PSTN.

As described above, the flow diagrams of FIGS. 4-8 show the architecture, functionality and operation of an implementation of example methods for converting or processing messages. The described functions can be embodied in source code including human-readable statements written in a programming language or machine code that comprises instructions recognizable by a suitable execution system such as a processor in a computer system. The machine code may be converted from the source code, etc. If embodied in hardware, each block may represent a circuit or a number of interconnected circuits to implement the specified logical function(s).

Reprocessing of translated facsimile messages with EPDF options can be performed in at least two ways. The first way is initiated using a network accessible interface via a browser. The interface is configured with a reprocess option, which directs the browser to an appropriately configured secondary interface that enables the user to select a new language for the translation. Alternatively, the e-mail message sent to the user is configured with a link, which provides an appropriately configured interface for the user to select a one-time change to the default language.

Figure 9:
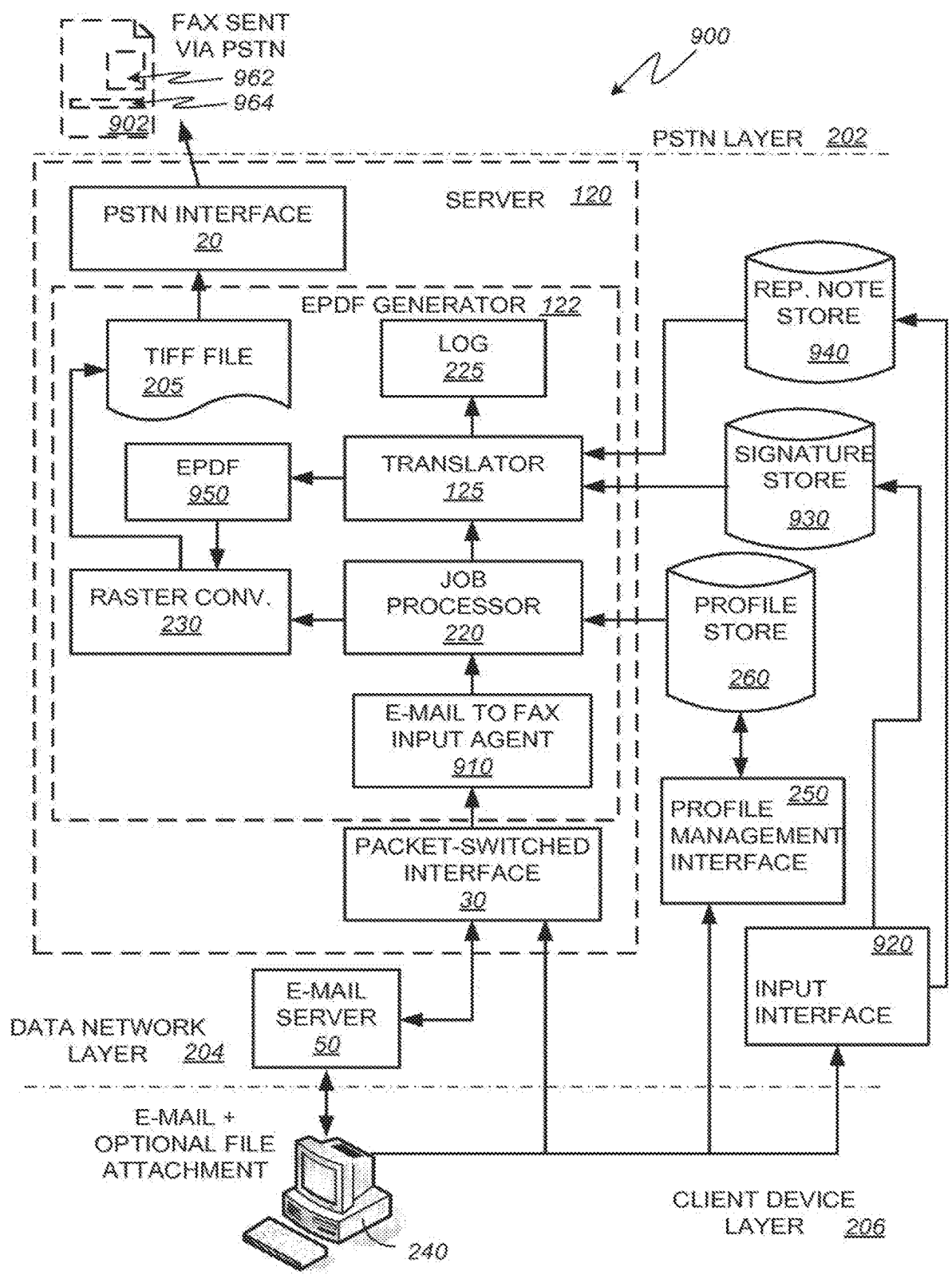
FIG. 9 is a functional block diagram illustrating outbound fax message processing through the network environment of FIG. 1.

FIG. 9 is a functional block diagram illustrating outbound facsimile message processing through the network environment 100 of FIG. 1. Diagram 900 illustrates the processing of an incoming e-mail message from the bottom to the top of the figure. Each incoming e-mail message traverses client device layer 206, data network layer 204 and PSTN layer 202, in that order.

As shown in FIG. 9, an e-mail message with or without an optional file attachment or attachments is received by e-mail server 50. The e-mail server 50 is a device which uses the post office protocol (e.g., POP3) for storing and forwarding e-mail messages. Periodically, server 120 sends a request to e-mail server 50 to send e-mail messages addressed to an e-mail account associated with the communication service. Alternatively, client device 240 communicates via one or more applications with server 120 via packet-switched interface 30. The server 120, in addition to housing packet-switched interface 30 and PSTN interface 20, includes EPDF generator 122, which generates the EPDF file 950 in accordance with user configuration information and other information. Thereafter, the server 120 converts the generated EPDF file 950 into an image format (i.e., TIFF file 205) via a raster conversion process 230, the result of which is forwarded to the PSTN interface 20 for delivery to a designated destination number via the PSTN interface 20 and the PSTN 10 (FIG. 1).

As also shown in FIG. 9, EPDF generator 122 is coupled to a profile store 260, a signature store 930 and a repositionable note store 940. Profile store 260 includes a database or other arrangement of user specific data that defines how the server 120 will process incoming and outgoing messages from a user or customer of the communication service. Profile store 260 receives customer specific identification and configuration information from profile management interface 250.

Signature store 930 includes a database or other arrangement of user specific image and location information that defines how the server 120 will integrate signatures on an outgoing facsimile message from a user or customer of the communication service. Signature store 930 receives the image information and location information via input interface 920, which is further coupled to client device 240.

Repositionable note store 940 includes a database or other arrangement of user specific content (e.g., text or image information) and location information that define how the server 120 will integrate representations of repositionable notes on an outgoing facsimile message from a user or customer of the communication service. Repositionable note store 940 receives the image information and location information via input interface 920.

In the illustrated embodiment, input interface 920, profile management interface 250, profile store 260, signature store 930 and repositionable note store 940 are depicted as devices external to the server 120 and EPDF generator 122. It should be understood that either, some or all of the input interface 920, profile management interface 250, profile store 260, signature store 930 and repositionable note store 940 may be integrated with server 120 and perhaps other functions and stores as may be desired.

Job processor 220 retrieves a user profile from profile store 260 that instructs the job processor 220 whether to direct the information from the e-mail message to the raster converter 230 or to translator 125 to generate an EPDF file. When the user profile indicates that an image only PDF file is desired, job processor 220 forwards the e-mail message to raster converter 230. In this case, the raster converter 230 generates a two-dimensional or image only PDF version of the e-mail message and communicates the resulting TIFF file 205 to PSTN interface 20, which in turn delivers the facsimile via PSTN 10. Alternatively, when the user profile indicates that an EPDF file is desired, that is, signature or repositionable notes or both are desired to be integrated with the e-mail message before being delivered by facsimile, job processor 220 forwards the e-mail message to translator 125 to generate the EPDF file.

Translator 125 includes a scan library, which enables the translation of information received via an e-mail message to the EPDF file 950. The scan library further includes an application interface that enables the integration of a signature and a representation of a repositionable note on designated pages at desired locations within the EPDF file. As will be explained in greater detail, a user profile includes one or more indicators that are forwarded to the translator 125 to direct the translator 125 to apply one or more of the above described interfaces during the creation of an EPDF file. When an EPDF file is desired and created in response to an inbound e-mail message, the translator 125 associates the EPDF file 950 with TIFF file 205. As part of this association, the translator 125 may save or otherwise store TIFF file 205 with the EPDF file. In addition, translator 125 generates and forwards a log entry to log 225. One or more entries in log 225 can be used to track usage or bill a customer of the communication service.

Whether the server 120 generates the EPDF file 950 before generating the image only file using raster converter 230 or forwards the incoming message directly to the raster converter 230, the resulting TIFF file 205 is forwarded via PSTN interface 20 to PSTN 10, which delivers the facsimile format message 902 to the designated destination number. When the EPDF file 950 is generated and used to create the TIFF file 205, the facsimile format message 902 includes a representation of a repositionable note 962 and a representation of a signature 964 on a page or pages and at locations desired by the user.

While e-mail server 50 is illustrated as a separate computing device, it should be understood that e-mail server 50 may be integrated with PSTN interface 20, packet-switched interface 30, e-mail to fax input agent 910, job processor 220, translator 125, raster converter 230, log 225, and perhaps other functions and stores as may be desired.

Although the illustrated embodiment of the client device layer 206 includes client computer 240, it should be understood that other devices such as a personal data assistant or a cellular phone with appropriate executables, communication and local interfaces may be substituted for client computer 240.

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

What is claimed is:

1. A method of outbound fax message processing, the method comprising:
   receiving, by a fax server computer, contents of a document through a packet-switched interface;
   generating, by the fax server computer, an enhanced portable document format (EPDF) file that includes the contents of the document and at least one of a representation of a signature or a representation of a repositionable paper note;
   converting, by the fax server computer, the EPDF file into image information in a facsimile format;
   communicating, by the fax server computer, the image information in the facsimile format to a destination facsimile device;
   receiving, by a network accessible interface running in a browser application, a request from a user to reprocess the image information in the facsimile format with EPDF options; and
   directing, by the network accessible interface running in the browser application, the browser application to a secondary interface that enables the user to select a new language for translation.

2. The method according to claim 1, further comprising:
   sending, by the fax server computer to an e-mail server computer, the image information in the facsimile format; and
   sending, by the e-mail server computer to a user, an e-mail message configured with a link, the link providing a user interface for the user to select a one-time change to a default language of the document.

3. The method according to claim 1, further comprising:
   receiving, by an email server computer from a client device, the document in an attachment to an e-mail message or a body of the e-mail message.

4. The method according to claim 3, wherein the fax server computer and the e-mail server computer reside on a single server machine or on separate computing devices.

5. The method according to claim 1, wherein the communicating is performed through at least one of a packet-switched network, a public switched telephone network, an internal internet protocol network, or the Internet.

6. The method according to claim 1, further comprising:
   periodically sending, by the fax server computer to an e-mail server computer, a request for e-mail messages addressed to an e-mail account associated with a communication service, the fax server computer communicatively connected to the e-mail server computer via the packet-switched interface.

7. A system for outbound fax message processing, the system comprising:
   a fax server computer having a processor, a non-transitory computer-readable medium, and stored instructions translatable by the processor to perform:
      receiving contents of a document through a packet-switched interface;
      generating an enhanced portable document format (EPDF) file that includes the contents of the document and at least one of a representation of a signature or a representation of a repositionable paper note;
      converting the EPDF file into image information in a facsimile format; and
      communicating the image information in the facsimile format to a destination facsimile device; and
   a network accessible interface running in a browser application, the network accessible interface configured for performing:
      receiving a request from a user to reprocess the image information in the facsimile format with EPDF options; and
      directing the browser application to a secondary interface that enables the user to select a new language for translation.

8. The system of claim 7, wherein the stored instructions are further translatable by the processor to perform:
   sending, to an e-mail server computer, the image information in the facsimile format, wherein the e-mail server computer sends an e-mail message configured with a link to a user, the link providing a user interface for the user to select a one-time change to a default language of the document.

9. The system of claim 7, further comprising:
an email server computer configured for performing:
receiving, from a client device, the document in an attachment to an e-mail message or a body of the e-mail message.

10. The system of claim 9, wherein the fax server computer and the e-mail server computer reside on a single server machine or on separate computing devices.

11. The system of claim 7, wherein the communicating is performed through at least one of a packet-switched network, a public switched telephone network, an internal internet protocol network, or the Internet.

12. The system of claim 7, wherein the stored instructions are further translatable by the processor to perform:
periodically sending, to an e-mail server computer, a request for e-mail messages addressed to an e-mail account associated with a communication service, the e-mail server computer communicatively connected to the fax server computer via the packet-switched interface.

13. A computer program product for outbound fax message processing, the computer program product comprising a non-transitory computer-readable medium storing instructions translatable by a fax server computer to perform:
receiving contents of a document through a packet-switched interface;
generating an enhanced portable document format (EPDF) file that includes the contents of the document and at least one of a representation of a signature or a representation of a repositionable paper note;
converting the EPDF file into image information in a facsimile format; and
communicating the image information in the facsimile format to a destination facsimile device;
wherein the non-transitory computer-readable medium storing further instructions translatable by a browser application to provide a network accessible interface configured for performing:
receiving a request from a user to reprocess the image information in the facsimile format with EPDF options; and
directing the browser application to a secondary interface that enables the user to select a new language for translation.

14. The computer program product of claim 13, wherein the instructions are further translatable by the fax server computer to perform:
sending, to an e-mail server computer, the image information in the facsimile format, wherein the e-mail server computer sends an e-mail message configured with a link to a user, the link providing a user interface for the user to select a one-time change to a default language of the document.

15. The computer program product of claim 13, wherein the non-transitory computer-readable medium storing further instructions translatable by an email server computer for performing:
receiving, from a client device, the document in an attachment to an e-mail message or a body of the e-mail message, wherein the fax server computer and the e-mail server computer reside on a single server machine or on separate computing devices.

16. The computer program product of claim 13, wherein the communicating is performed through at least one of a packet-switched network, a public switched telephone network, an internal internet protocol network, or the Internet.

17. The computer program product of claim 13, wherein the instructions are further translatable by the fax server computer to perform:
periodically sending, to an e-mail server computer, a request for e-mail messages addressed to an e-mail account associated with a communication service, the e-mail server computer communicatively connected to the fax server computer via the packet-switched interface.

* * * * *